(12) United States Patent
Kwon et al.

(10) Patent No.: US 11,630,545 B2
(45) Date of Patent: Apr. 18, 2023

(54) TOUCH SENSOR, WINDOW STACK STRUCTURE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Do Hyoung Kwon, Gyeonggi-do (KR); Sung Jin Noh, Gyeonggi-do (KR); Sang Jin Park, Gyeonggi-do (KR); Han Tae Ryu, Chungcheongbuk-do (KR); Jun Gu Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/402,903

(22) Filed: Aug. 16, 2021

(65) Prior Publication Data

US 2021/0373713 A1 Dec. 2, 2021

Related U.S. Application Data

(63) Continuation of application No. PCT/KR2020/001700, filed on Feb. 6, 2020.

(30) Foreign Application Priority Data

Feb. 14, 2019 (KR) .................. 10-2019-0017312
Feb. 14, 2019 (KR) .................. 10-2019-0017313

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
None
See application file for complete search history.

(56) References Cited

U.S. PATENT DOCUMENTS

2017/0083160 A1    3/2017  Hashida et al.
2017/0315590 A1*  11/2017  Ko ........................ G06F 3/041
(Continued)

FOREIGN PATENT DOCUMENTS

| CN | 107092382 A | * | 8/2017 | ......... G02F 1/13338 |
| CN | 108279813 B | * | 6/2021 | ........... G06F 3/0416 |
| JP | 2014-191465 A |   | 10/2014 | |

(Continued)

OTHER PUBLICATIONS

International Search Report for PCT/KR2020/001700 dated May 14, 2020.

*Primary Examiner* — Duane N Taylor, Jr.
(74) *Attorney, Agent, or Firm* — The PL Law Group, PLLC (57) ABSTRACT

A touch sensor according to an embodiment of the present invention includes a substrate layer, and sensing electrodes which are disposed on the substrate layer, and have etching regions formed therein in a periodically repeated manner and respectively having a width of 5 to 15 μm. Through the etching regions, transmittance may be improved and optical interference with an image display device may be reduced. The present invention also provides a window stack structure and an image display device including the touch sensor.

17 Claims, 10 Drawing Sheets

(56) References Cited

U.S. PATENT DOCUMENTS

2018/0120971 A1* 5/2018 Lee ..................... G06F 3/0446
2020/0218106 A1* 7/2020 Shishido ............... G06F 3/0412

FOREIGN PATENT DOCUMENTS

| KR | WO 2013/063176 A1 | 5/2013 |
| KR | 10-2013-0108219 A | 10/2013 |
| KR | 10-2016-0116495 A | 10/2016 |
| KR | 10-2017-0122892 A | 11/2017 |
| KR | 10-1936939 B1 | 1/2019 |

* cited by examiner

TOUCH SENSOR, WINDOW STACK STRUCTURE INCLUDING THE SAME AND IMAGE DISPLAY DEVICE INCLUDING THE SAME

PRIORITY

The present application is a continuation application to International Application No. PCT/KR2020/001700 with an International Filing Date of Feb. 6, 2020, which claims the benefit of Korean Patent Application Nos. 10-2019-0017312 filed on Feb. 14, 2019 and 10-2019-0017313 filed on Feb. 14, 2019 at the Korean Intellectual Property Office, the disclosures of which are incorporated by reference herein in their entirety.

BACKGROUND

1. Technical Field

The present invention relates to a touch sensor, a window stack structure and an image display device including the same, and more specifically, to a touch sensor including patterned sensing electrodes, and a window stack structure and an image display device including the same.

2. Background Art

Recently, according to development of the information-oriented society, needs for a display field have also been presented in various forms. For example, various flat panel display devices having characteristics such as a slimness, weight reduction, and low power consumption, etc., for instance, a liquid crystal display device, a plasma display panel device, an electroluminescent display device, an organic light-emitting diode display device, etc., have been studied.

Meanwhile, electronic devices, in which an image display function and an information input function are implement together by combining a touch panel or a touch sensor as an input device attached on the display device so as to allow a user to select instructions displayed on a screen by a finger thereof or an object such as a touch pen and input a command of the user with the display device, have been developed.

The touch sensor may be laminated on the display panel, and when a sensing electrode of the touch sensor is viewed by a user, image quality of the display device may be deteriorated. In addition, when the sensing electrode is overlapped with the electrodes and wires of the display panel, a moiré pattern may be viewed by the user.

SUMMARY

According to an aspect of the present invention, there is provided a touch sensor having improved optical properties.

According to an aspect of the present invention, there is provided a window stack structure and an image display device including the touch sensor having the improved optical properties.

To achieve the above objects, the following technical solutions are adopted in the present invention.

1. A touch sensor including: a substrate layer; and sensing electrodes disposed on the substrate layer, and including etching regions periodically repeated therein and respectively having a width of 5 to 15 μm.

2. The touch sensor according to the above 1, wherein the etching regions include a slit shape formed inside the sensing electrode.

3. The touch sensor according to the above 1, wherein the etching region includes a curved shape selected from the group consisting of a sine curve, a cosine curve, a conic section, a catenary, a curve of pursuit, a cycloid, a trochoid and a cardioid.

4. The touch sensor according to the above 1, wherein the etching region includes a water wave shape extending between vertices of an imaginary polygon.

5. The touch sensor according to the above 4, wherein the etching region includes a shape in which a water wave of one period is cut.

6. The touch sensor according to the above 1, wherein the etching regions are inclined at a predetermined tilting angle with respect to a width direction or a length direction of the touch sensor.

7. The touch sensor according to the above 6, wherein the tilting angle is 15 to 75 degrees.

8. The touch sensor according to the above 6, wherein the tilting angle is 30 to 60 degrees.

9. The touch sensor according to the above 1, wherein the sensing electrodes include: first sensing electrodes which form a sensing electrode row; and second sensing electrodes which form a sensing electrode column, wherein the etching regions include first etching regions formed in the first sensing electrodes and second etching regions formed in the second sensing electrodes.

10. The touch sensor according to the above 9, wherein the sensing electrode row extends to be inclined with respect to the width direction of the touch sensor at a first tilting angle, and the sensing electrode column extends to be inclined with respect to the length direction of the touch sensor at a second tilting angle.

11. The touch sensor according to the above 10, wherein the first tilting angle and the second tilting angle are 15 to 75 degrees, respectively.

12. The touch sensor according to the above 10, wherein the first tilting angle and the second tilting angle are 30 to 60 degrees, respectively.

13. The touch sensor according to the above 9, wherein the sensing electrode column further includes connection parts which integrally connect the second sensing electrodes adjacent to each other, and the sensing electrode row includes bridge electrodes which electrically connect the first sensing electrodes adjacent to each other.

14. The touch sensor according to the above 13, wherein the connection part includes a third etching region formed therein.

15. The touch sensor according to the above 14, wherein the bridge electrode is overlapped with the third etching region of the connection part in a planar direction.

16. The touch sensor according to the above 9, further including a dummy pattern defined by separation regions formed between peripheries of the first sensing electrode and second sensing electrode adjacent to each other.

17. The touch sensor according to the above 16, wherein the sensing electrodes include unit cells surrounded by the etching regions, and the dummy pattern includes the same shape as the unit cell.

18. A window stack structure including: a window substrate; and the touch sensor according to claim 1 stacked on the window substrate.

19. An image display device including: a display panel; and the touch sensor according to claim 1 stacked on the display panel.

20. The image display device according to the above 19, wherein the etching regions are disposed to be tilted at a predetermined tilting angle with respect to a width direction or a length direction of the display panel. The sensing electrodes of the touch sensor according to embodiments of the present invention may include etching regions formed therein while having a wave slit shape, for example. The etching regions may be included in the sensing electrodes, so that a moiré phenomenon caused by regular overlapping of pixel structures of the display panel under the touch sensor may be suppressed or reduced. Accordingly, deterioration of image quality of the image display device due to the insertion of the touch sensor may be prevented.

According to some embodiments, the etching region may be formed to be inclined at a predetermined tilting angle with respect to a length direction or a width direction of the touch sensor. In addition, the sensing electrodes may also be arranged in a direction inclined at the predetermined tilting angle. Accordingly, the moiré phenomenon by reducing regular overlapping with the pixel structure may be more effectively prevented.

Further, a transmittance of the sensing electrode may be improved by the etching region, such that image quality of the image display device may be further enhanced.

DETAILED DESCRIPTION

Embodiments of the present invention provide a touch sensor including sensing electrodes having etching regions formed therein and having improved optical properties. In addition, embodiments of the present invention provide an image display device including the touch sensor with improved image quality.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

In the following drawings, two directions, which are parallel to the touch sensor or the same plane (e.g., an upper surface of a substrate layer 105) and cross each other, are defined as a first direction and a second direction, respectively. For example, the first direction and the second direction may cross each other perpendicularly.

Figure 1:
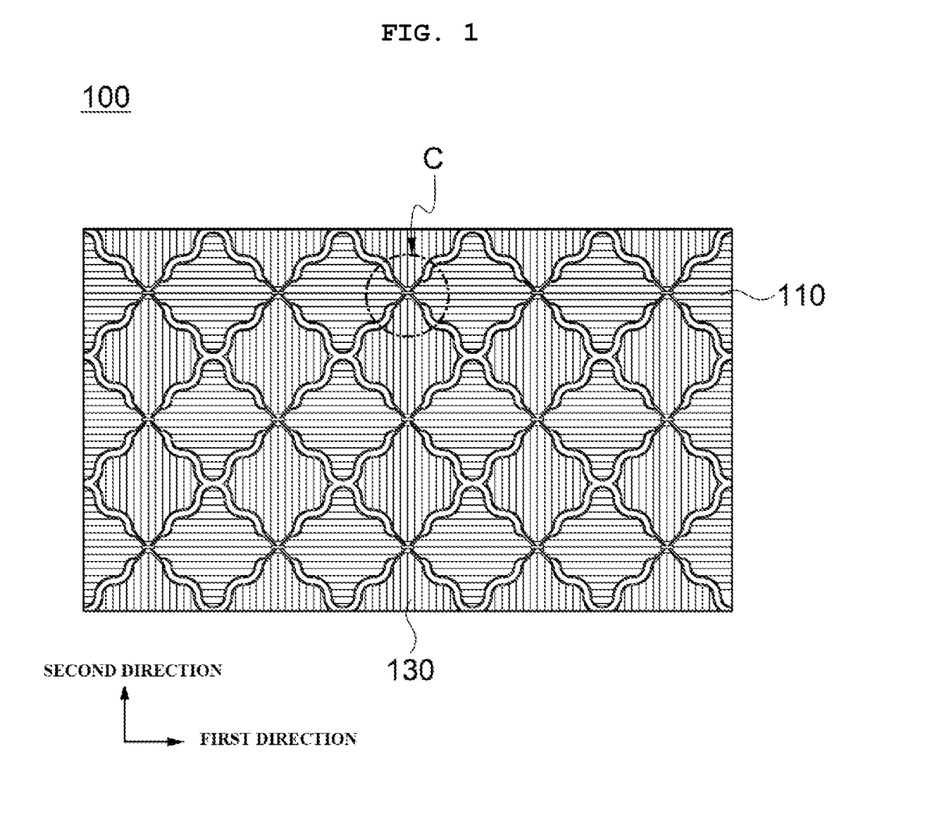
FIGS. 1 and 2 are a plan view and a cross-sectional view illustrating an exemplary electrode structure of a touch sensor, respectively.
Figure 2:
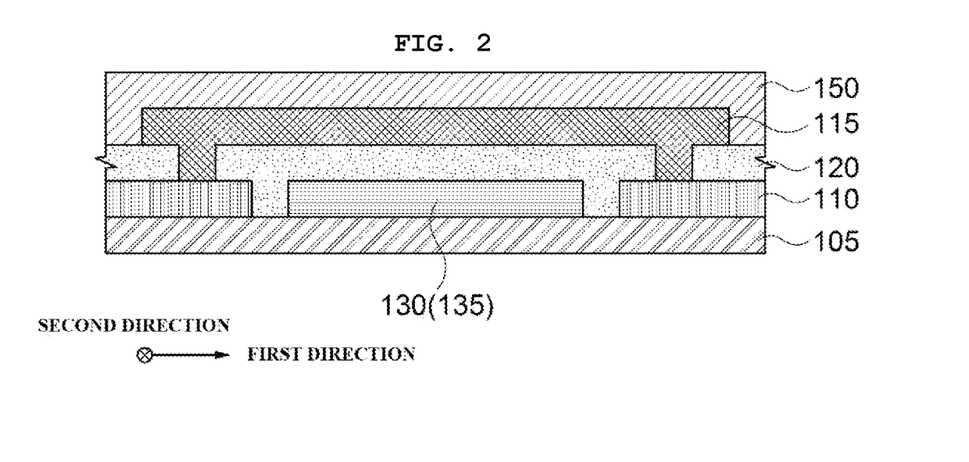

FIGS. 1 and 2 are a plan view and a cross-sectional view illustrating an exemplary electrode structure of a touch sensor, respectively. Specifically, FIG. 2 is a cross-sectional view taken at a cross region C shown in FIG. 1, and FIG. 2 illustrates a touch sensor having a top-bridge structure as an example.

FIGS. 1 and 2 are provided for describing an arrangement of the sensing electrode of the touch sensor, and characteristics and scope of the present invention are not defined or limited to those as shown in FIGS. 1 and 2. For example, the touch sensor according to the embodiments of the present invention may include the configuration and structure shown in FIGS. 1 and 2, except for the arrangement direction of the sensing electrodes and/or formation and arrangement of the etching regions, and it should be construed that some modifications of those shown in FIGS. 1 and 2 are included in the embodiments of the present invention.

A touch sensor 100 may include the substrate layer 105 and sensing electrodes 110 and 130 arranged on the substrate layer 105.

The substrate layer 105 is used as a meaning of encompassing a film-type substrate used as a base layer to form the sensing electrodes 110 and 130, or an object on which the sensing electrodes 110 and 130 are formed. In some embodiments, the substrate layer 105 may refer to a display panel on which the sensing electrodes 110 and 130 are directly formed.

For example, the substrate layer 105 may include a substrate or a film material commonly used in the touch sensor without particular limitation thereof, and may include, for example, glass, a polymer, and/or an inorganic insulation material. Examples of the polymer may include a cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA) and the like. Examples of the inorganic insulation material may include silicon oxide, silicon nitride, silicon oxynitride, metal oxide and the like.

A layer or film member of an image display device into which the touch sensor is inserted may be provided as the substrate layer 105. For example, an encapsulation layer, a passivation layer, or the like included in the display panel may be provided as the substrate layer 105.

The sensing electrodes 110 and 130 may include first sensing electrodes 110 and second sensing electrodes 130. For example, the sensing electrodes 110 and 130 may be arranged so as to be driven in a mutual capacitance method.

The first sensing electrodes 110 may be arranged in a first direction (e.g., a row direction or width direction). The first sensing electrodes 110 may have a pattern form of an independent island, respectively, and the first sensing electrodes 110 adjacent to each other in the first direction may be electrically connected with each other by bridge electrodes 115.

Thus, a first sensing electrode row extending in the first direction may be defined, and a plurality of first sensing electrode rows may be arranged in a second direction.

The second sensing electrodes 130 may be arranged in the second direction. The second sensing electrodes 130 adjacent to each other in the second direction may be connected with each other by connection parts 135. The second sensing electrodes 130 and the connection parts 135 may be integrally connected with each other to provide as a substantially single member. In this case, the second sensing electrodes 130 and the connection parts 135 may be patterned together from the same conductive layer and located on the same layer or on the same level.

Thus, a second sensing electrode column extending in the second direction may be defined, and a plurality of second sensing electrode columns may be arranged in the first direction.

The sensing electrodes 110 and 130 and/or the bridge electrode 115 may include metal, a metal alloy, a metal wire, or a transparent conductive oxide.

For example, the sensing electrodes 110 and 130 and/or the bridge electrode 115 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca), or an alloy thereof (e.g., a silver-palladium-copper (APC) alloy). These may be used alone or in combination of two or more.

The sensing electrodes 110 and 130 and/or the bridge electrode 115 may include a transparent conductive oxide such as indium tin oxide (ITO), indium zinc oxide (IZO), zinc oxide (ZnO), indium zinc tin oxide (IZTO), cadmium tin oxide (CTO) and the like.

In some embodiments, the sensing electrodes 110 and 130 and/or the bridge electrode 115 may include a lamination structure of a transparent conductive oxide and metal. For example, the sensing electrodes 110 and 130 and the bridge electrode 115 may have a two-layer structure of a transparent conductive oxide layer-metal layer, or a three-layer structure of a transparent conductive oxide layer-metal layer-transparent conductive oxide layer. In this case, resistance may be reduced to improve signal transmission speed while improving flexible properties by the metal layer, and corrosion resistance and transparency may be improved by the transparent conductive oxide layer.

As shown in FIG. 1, in some embodiments, edges of the sensing electrodes 110 and 130 may have a substantially wave shape. In this case, a moiré phenomenon may be more effectively suppressed together with etching regions formed in the sensing electrodes 110 and 130, which will be described below.

As shown in FIG. 2, an insulation layer 120 at least partially covering the first sensing electrodes 110 and the connection parts 135 may be formed on the substrate layer 105. The bridge electrode 115 may be disposed on the insulation layer 120 to electrically connect the first sensing electrodes 110 adjacent to each other through a contact hole formed in the insulation layer 120, for example.

A passivation layer 150 for protecting the touch sensor may be formed on the insulation layer 120 and the bridge electrode 115.

The insulation layer 120 and/or the passivation layer 150 may include an inorganic insulation material such as silicon oxide or silicon nitride, or an organic insulation material such as an acrylic resin or a siloxane resin.

As described with reference to FIGS. 1 and 2, the touch sensor 100 may include the first sensing electrodes 110 and the second sensing electrodes 130 which are regularly arranged in the first direction and the second direction, respectively.

When applying the touch sensor 100 to an image display device, a thin film transistor array (TFT array) included in the display panel may also include a pixel structure regularly arranged in the first direction and the second direction. For example, cell-shaped pixels may be regularly repeated while a plurality of scan lines and data lines cross each other.

Accordingly, overlapping of the sensing electrodes 110 and 130 of the touch sensor 100 with the pixel structure may be periodically repeated, and in this case, optical interference according to the generation of a new spatial frequency may be caused. A moiré pattern may be observed by a user due to the optical interference, and thus image quality of the image display device may be deteriorated.

Figure 3:
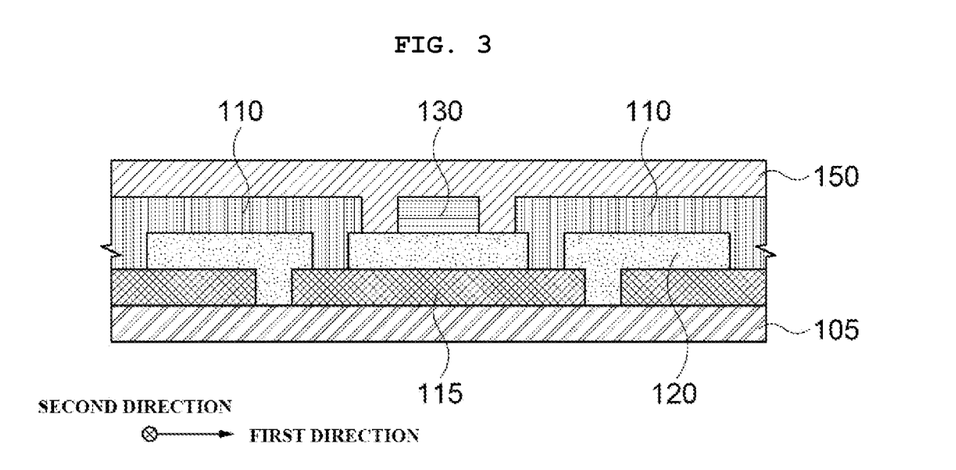
FIG. 3 is a schematic cross-sectional view illustrating an example of the electrode structure of the touch sensor.

FIG. 3 is a schematic cross-sectional view illustrating an example of the electrode structure of the touch sensor. For example, FIG. 3 illustrates an electrode structure of a touch sensor having a bottom-bridge structure as an example. The structures/configurations which are substantially the same as those described with reference to FIGS. 1 and 2 will not be described in detail.

Referring to FIG. 3, the bridge electrodes 115 may be disposed below the sensing electrodes 110 and 130. For example, the bridge electrodes 115 may be formed on the substrate layer 105, and the insulation layer 120 may be formed on the substrate layer 105 to partially cover the bridge electrode 115. The insulation layer 120 may include a contact hole partially exposing an upper surface of the bridge electrodes 115.

The second sensing electrodes 130 may be arranged in the second direction so as not to contact with the bridge electrodes 115 on the insulation layer 120.

The first sensing electrodes 110 may be formed on the insulation layer 120 so as to be in contact or electrically connected with the bridge electrode 115 while filling the contact holes. Thus, the first sensing electrodes 110 adjacent to each other in the first direction may be electrically connected with each other through the bridge electrode 115 while maintaining insulation from the second sensing electrodes 130.

Figure 4:
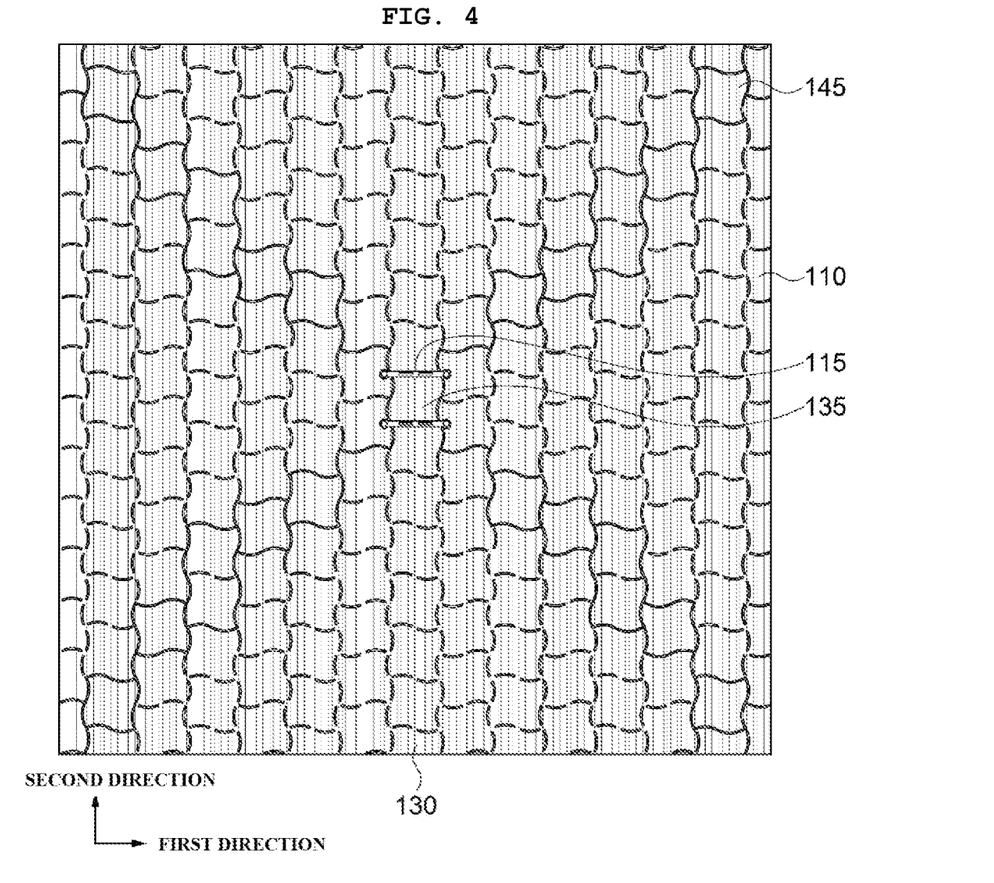
FIGS. 4 to 6 are partially enlarged plan views for describing a pattern structure of a sensing electrode according to exemplary embodiments.
Figure 5:
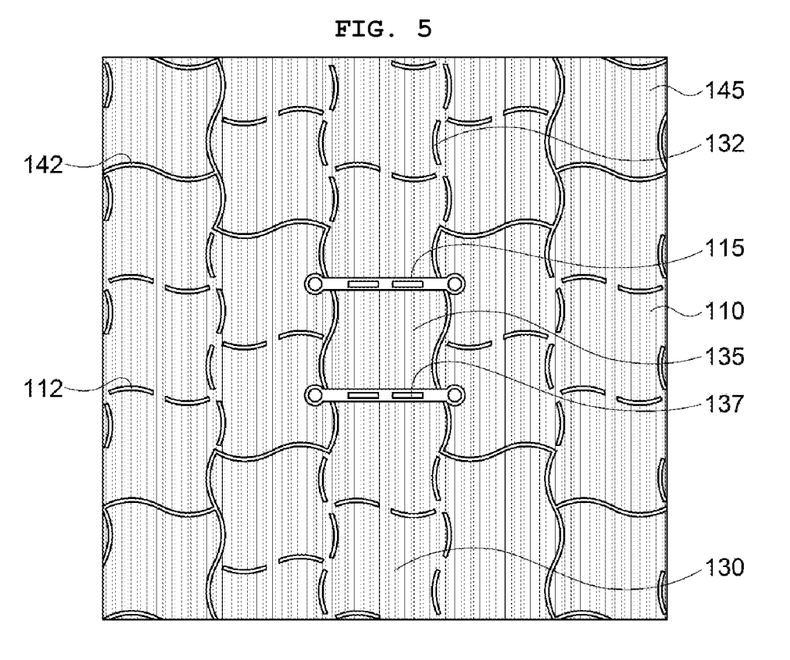
Figure 6:
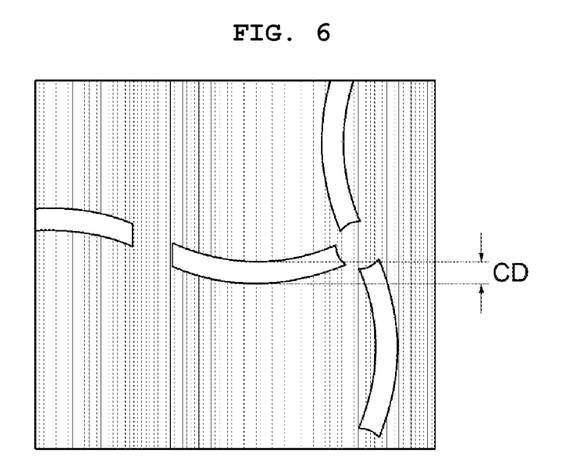

FIGS. 4 to 6 are partially enlarged plan views for describing a pattern structure of a sensing electrode according to exemplary embodiments.

Specifically, FIG. 4 is an enlarged view of the electrode structure in a cross region C shown in FIG. 1, FIG. 5 is a further enlarged view of a peripheral region of the bridge electrode 115 shown in FIG. 4, and FIG. 6 is an enlarged view of an etching region formed in the sensing electrode.

Referring to FIGS. 4 and 5, as described with reference to FIGS. 1 to 3, the touch sensor may include the first sensing electrodes 110 and the second sensing electrodes 130. The second sensing electrodes 130 may be integrally connected with each other through the connection parts 135 in the second direction. The first sensing electrodes 110 may be arranged to be spaced apart from each other in the first direction, and may be electrically connected with each other through the bridge electrode 115.

According to exemplary embodiments, etching regions 112 and 132 may be formed in the sensing electrodes 110 and 130. First etching regions 112 may be formed in the first sensing electrode 110, and second etching regions 132 may be formed in the second sensing electrode 130.

As used herein, the term "etching region" may refer to a region or space which is removed by etching in a predetermined shape inside a conductive layer or conductive pattern. According to exemplary embodiments, the etching region may have a shape such as a slit, hole, opening or the like.

In some embodiments, as shown in FIG. 5, the etching regions 112 and 132 may be formed as a curve-shaped slit. The curved shape of the etching regions 112 and 132 may include a shape such as a sine curve, a cosine curve, a conic section, a catenary, a curve of pursuit, a cycloid, a trochoid, a cardioid and the like.

The etching regions 112 and 132 may be regularly and repeatedly arranged. For example, the etching regions 112 and 132 may be arranged along sides of an imaginary rectangle (e.g., a square).

As shown in FIG. 5, the etching regions 112 and 132 may have a shape in which a water wave corresponding to one period is segmented between vertices of the imaginary rectangle. In an embodiment, the imaginary rectangles may be arranged in a zigzag form so that the vertices thereof are shifted.

A dummy pattern 145 may be formed between the first sensing electrode 110 and the second sensing electrode 130 adjacent to each other. The dummy pattern 145 may be defined by separation regions 142 extending along peripheries of the first sensing electrode 110 and the second sensing electrode 130. The separation region 142 may have substantially the same or similar waveform to the first and second etching regions 112 and 132. Thereby, the dummy pattern 145 may have a shape substantially the same as or similar to the shape of the conductive pattern inside the sensing electrodes 110 and 130 (e.g., a rectangle that four sides are transformed into the water wave).

Accordingly, uniformity of the electrode structure in the touch sensor is improved, such that it is possible to prevent the electrode from being viewed depending on a difference in the pattern shape for each region.

The bridge electrode 115 may cross the connection part 135 included in the second sensing electrode column. In some embodiments, a third etching region 137 may be formed in the connection part 135. For example, the third etching region 137 may have a slit shape extending in the first direction.

The bridge electrode 115 may be disposed to be overlapped with the third etching region 137 included in the connection part 135 in a planar direction. Thus, a transmittance due to overlapping of the electrodes in the cross region C may be prevented from being reduced and the electrode may be prevented from being viewed due to a color change.

According to the above-described exemplary embodiments, each of the sensing electrodes 110 and 130 may have the etching regions 112 and 132 formed therein. Accordingly, the moiré phenomenon caused by regular overlapping of the sensing electrodes 110 and 130 with the pixel structure included in the display panel may be suppressed or reduced. For example, a spatial frequency generated due to the overlapping of the sensing electrodes 110 and 130 with the pixel structure may be suppressed or canceled by the etching regions 112 and 132.

In addition, the etching regions 112 and 132 may be provided as optical slits to more effectively suppress the moiré phenomenon due to light diffraction or scattering, and prevent the sensing electrodes 110 and 130 from being viewed by the user. Further, a transmittance of the touch sensor or the sensing electrodes 110 and 130 may be improved by the etching regions 112 and 132.

Referring to FIG. 6, the etching regions 112 and 132 may have a width (or critical dimension (CD)) in a range of about 5 to 15 μm. Within the above width CD range, Moiré prevention and slit effects through the above-described etching regions 112 and 132 may be substantially implemented.

For example, when the width of the etching regions 112 and 132 exceeds about 15 μm, the above-described Moiré prevention effect may not be substantially implemented, and the etching regions 112 and 132 may not function as the slit.

When the width of the etching regions 112 and 132 is less than about 5 μm, the etching regions 112 and 132 having a desired shape and arrangement may not be uniformly formed.

In a preferred embodiment, the etching regions 112 and 132 may have a width CD of about 5 to 12 μm.

In an embodiment, when forming the etching regions 112 and 132, a width of a region (e.g., an opening) corresponding to the etching regions 112 and 132 in an etching mask may be formed to be smaller than a target width CD in consideration of an occurrence of over-etching. For example, the corresponding region may be designed to have a width of about 1 to 3 μm (e.g., 2 μm) smaller than the target width CD.

Figure 7:
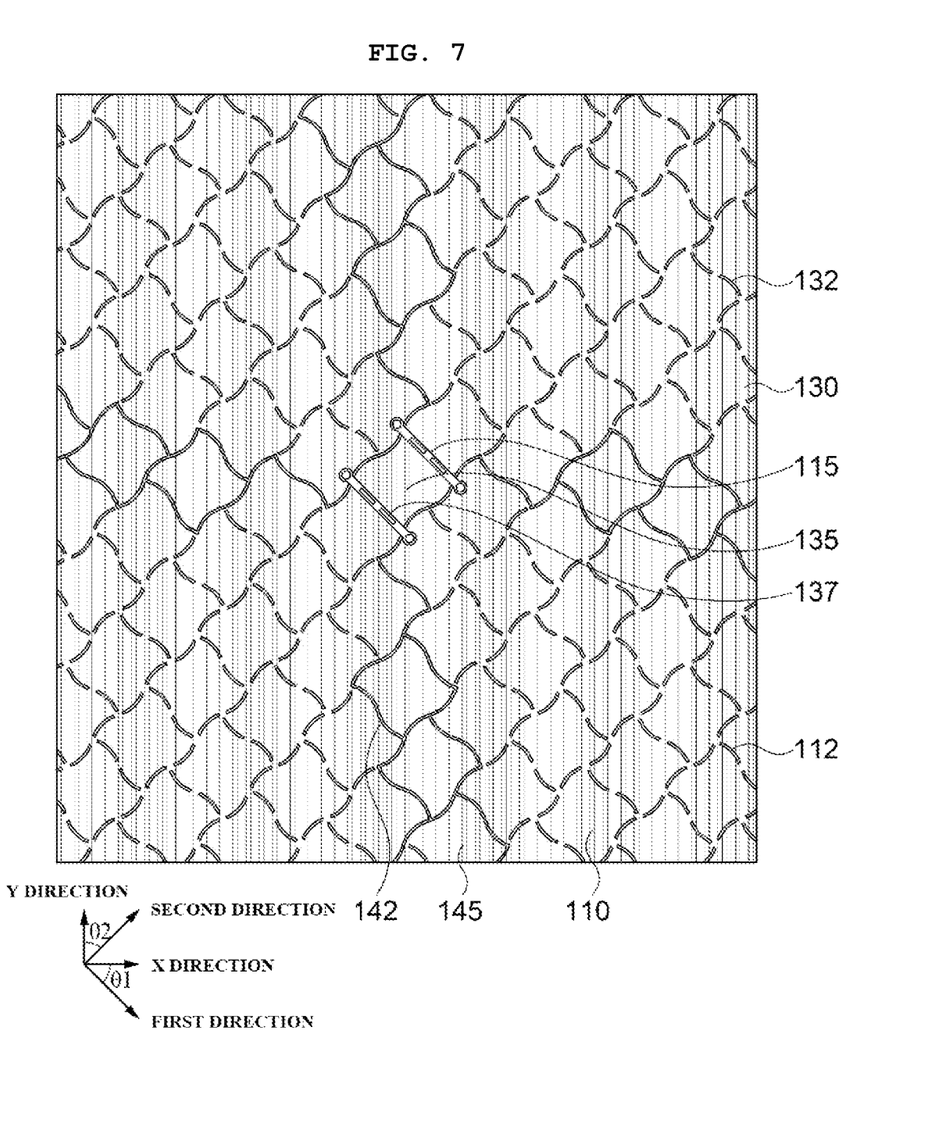
FIG. 7 is a plan view for describing a pattern structure of a sensing electrode according to some exemplary embodiments.

FIG. 7 is a plan view for describing a pattern structure of a sensing electrode according to some exemplary embodiments.

In FIG. 7, an X direction may refer to a width direction of the touch sensor or a display panel on which the touch sensors are laminated, and a Y direction may refer to a length direction of the touch sensor or the display panel. The X direction and the Y direction may be parallel to the touch sensor or the same plane (e.g., the upper surface of the substrate layer 105) and may be perpendicular to each other.

Referring to FIG. 7, the etching regions 112 and 132 may be formed to be inclined at a predetermined tilting angle with respect to the X direction and/or the Y direction. As described above, the X direction may correspond to the width direction of the touch sensor or the image display device, and the Y direction may correspond to the length direction of the touch sensor or the image display device. Further, the pixel structures of the image display device may be arranged in the X and Y directions.

For example, the etching regions 112 and 132 may extend in the first direction or the second direction. The first direction may be inclined at a first tilting angle θ1 with respect to the X direction. The second direction may be inclined at a second tilting angle θ2 with respect to the Y direction.

In some embodiments, the first and second tilting angles may be adjusted in a range of about 15 to 75 degrees (°), respectively. In a preferred embodiment, the first and second tilting angles may be adjusted in a range of about 30 to 60 degrees, respectively.

In some embodiments, the arrangement direction of the sensing electrodes 110 and 130 may also be tilted with respect to the X and Y directions. For example, the first sensing electrodes 110 may be arranged in the first direction inclined at the first tilting angle θ1 in the X direction. The second sensing electrodes 130 may be arranged in the second direction inclined at the second tilting angle θ2 in the Y direction.

Accordingly, the first sensing electrode row extending in the first direction may be defined, and a plurality of first sensing electrode rows may be arranged in the second direction. In addition, the second sensing electrode column extending in the second direction may be defined, and a plurality of the second sensing electrode columns may be arranged in the first direction.

In an embodiment, the bridge electrode 115 which electrically connects the first sensing electrodes 110 adjacent to each other may also be tilted, and may extend in the first direction, for example.

As described above, by disposing the etching regions 112 and 132 and/or the sensing electrodes 110 and 130 to be shifted from the pixel arrangement included in the display panel, regular overlapping phenomenon with the pixel structures included in the display panel may be further relieved, thus to further reduce or suppress a generation of moiré.

As described above, the etching regions 112 and 132 may have a width (or critical dimension CD) in a range of about 5 to 15 µm. For example, the width CD of the etching regions 112 and 132 may refer to a width in the second direction when the etching regions 112 and 132 extend in the first direction, and may refer to a width in the first direction when the etching regions 112 and 132 extend in the second direction.

FIGS. 8 to 15 are plan views for describing pattern structures of sensing electrodes according to some exemplary embodiments.

Figure 8:
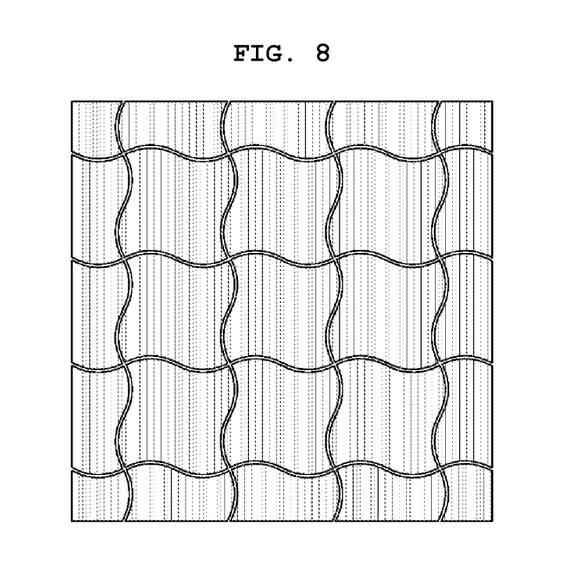
FIGS. 8 to 15 are plan views for describing pattern structures of sensing electrodes according to some exemplary embodiments.
Figure 9:
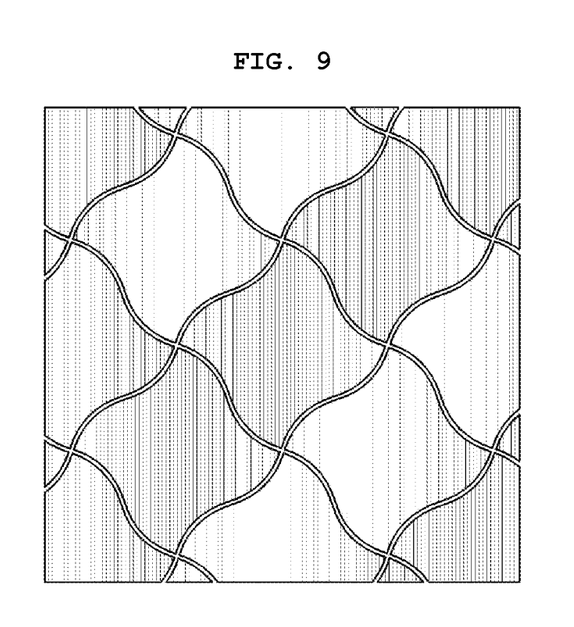

Referring to FIGS. 8 and 9, the etching regions may have a shape in which each side of a unit cell having an imaginary rectangular or a diamond pattern formed by tilting the rectangle is transformed into a water wave corresponding to one period.

The unit cells in which each side is transformed into the water wave may be repeated while sharing the vertices with each other within the sensing electrode. For example, one vertex may be shared by four unit cells.

Figure 10:
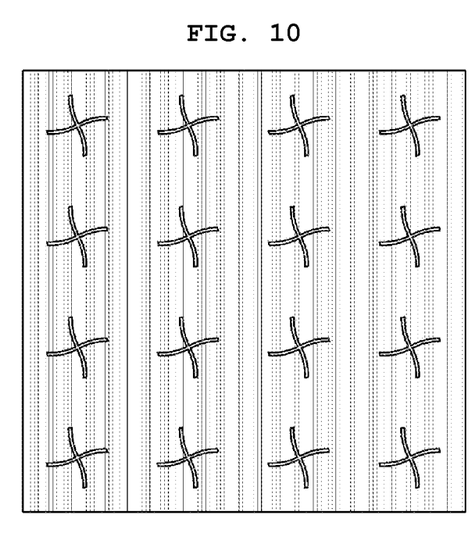
Figure 11:
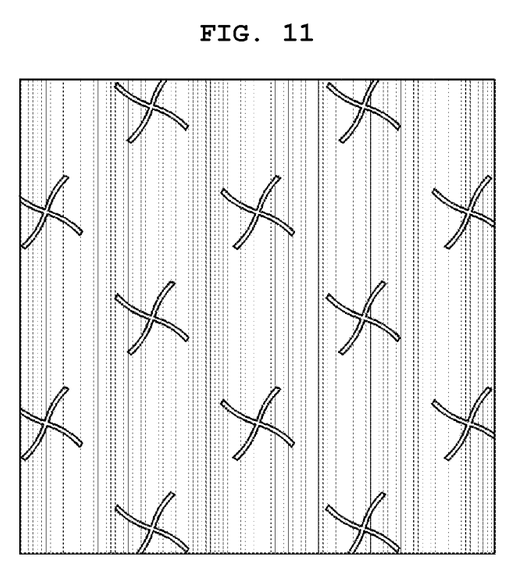

Referring to FIGS. 10 and 11, the etching region may have a shape in which a portion of each side of the unit cell shown in FIGS. 8 and 9 is cut. For example, the etching region may have a cross shape in which each tip radiates from a vertex of each unit cell in a wave shape.

Figure 12:
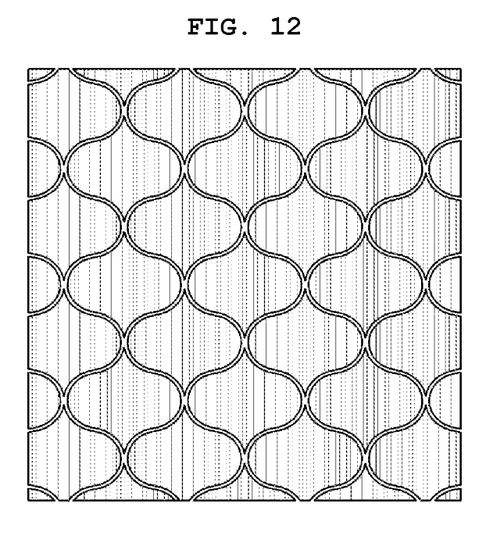

Referring to FIG. 12, the etching regions may have a shape in which two adjacent sides of an imaginary diamond pattern is transformed into a water wave corresponding to one period. For example, the unit cell may be defined by two water wave-shaped etching regions of opposite phases facing each other.

Figure 13:
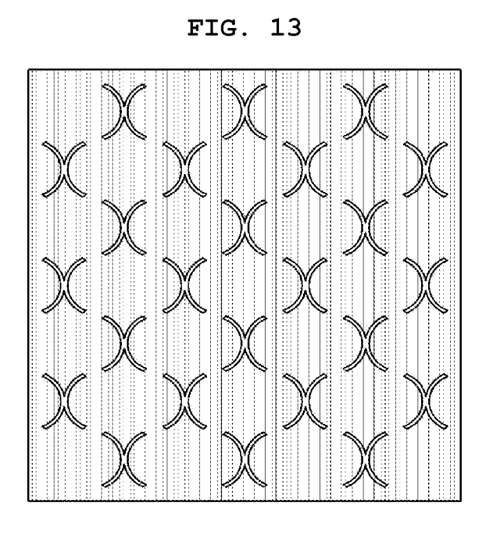

Referring to FIG. 13, the etching region may have a shape in which a portion of the etching region for defining the unit cell of FIG. 12 is cut. For example, the etching regions may include one segmented portion at each side of the imaginary diamond.

Figure 14:
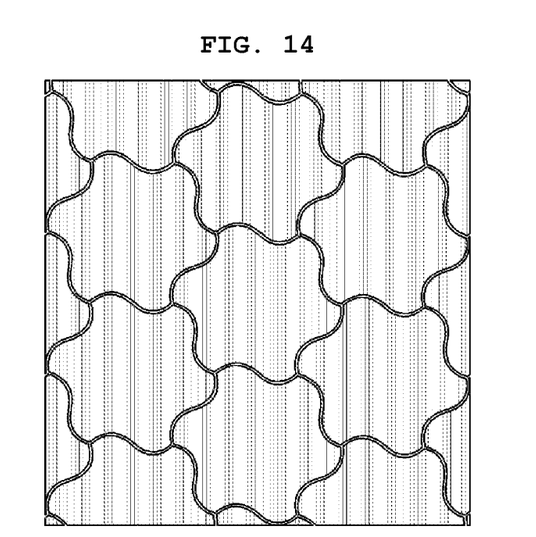

Referring to FIG. 14, the etching regions may have a shape in which each side of a unit cell having an imaginary hexagonal pattern is transformed into a water wave corresponding to one period. Each unit cell may be defined by six etching regions of the same waveform.

The unit cells in which each side is transformed into the water wave may be repeated while sharing the vertices with each other within the sensing electrode. For example, one vertex may be shared by three unit cells.

Figure 15:
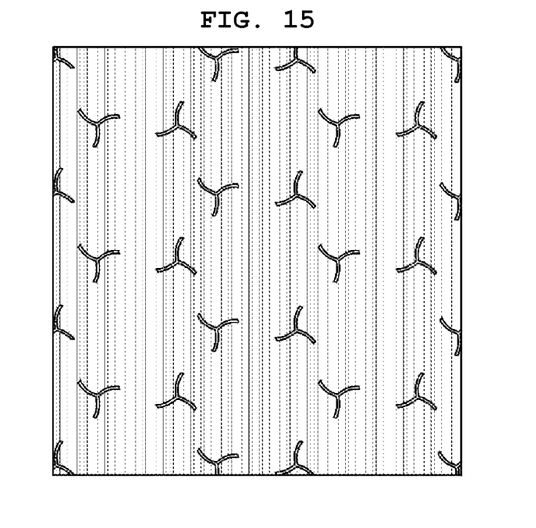

Referring to FIG. 15, the etching region may have a shape in which a portion of each side of the unit cell shown in FIG. 14 is cut. For example, each etching region may include three radiation slits having a wave shape at the vertices of each unit cell.

The above-described shapes of the etching region and the unit cell are exemplary, and may be appropriately modified in consideration of resolution of a patterning process and compatibility with the image display device.

Figure 16:
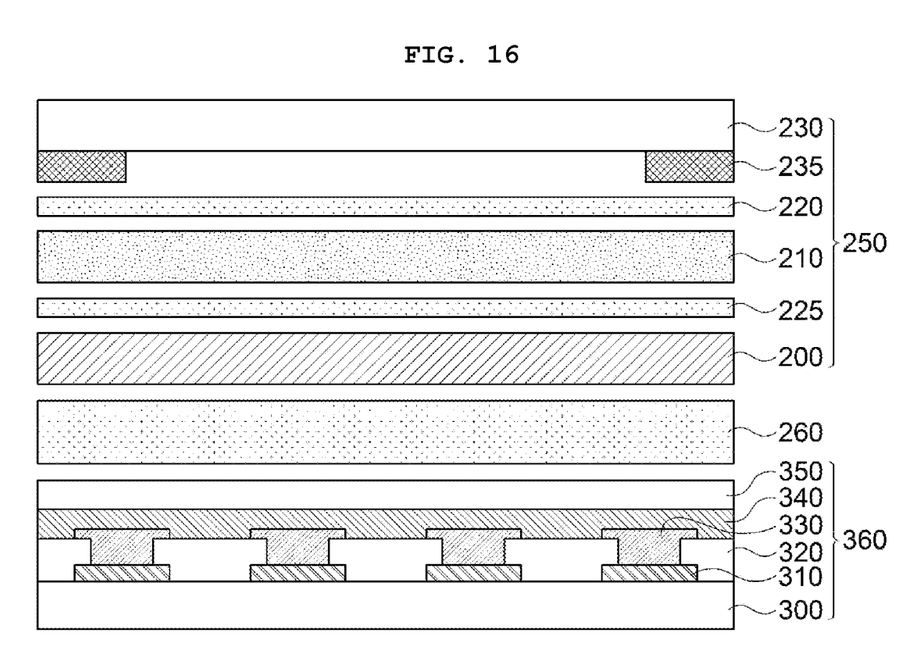
FIG. 16 is a schematic cross-sectional view for describing a window stack structure and an image display device according to exemplary embodiments.

FIG. 16 is a schematic cross-sectional view for describing a window stack structure and an image display device according to exemplary embodiments.

A window stack structure 250 may include a window substrate 230, a polarizing layer 210, and the touch sensor 200 according to the above-described exemplary embodiments.

The window substrate 230 may include, for example, a hard coating film or a glass film (e.g., ultra-thin glass (UTG)). In an embodiment, the window substrate 230 may have a light-shielding pattern 235 formed on a periphery of one surface thereof. The light-shielding pattern 235 may include, for example, a color printing pattern, and may have a single layer or multilayer structure. A bezel part or non-display region of the image display device may be defined by the light-shielding pattern 235.

The polarizing layer 210 may include a coating type polarizer or polarizing plate. The coating type polarizer may include a liquid crystal coating layer including a polymerizable liquid crystal compound and a dichroic dye. In this case, the polarizing layer 210 may further include an alignment film for imparting alignment to the liquid crystal coating layer.

For example, the polarizing plate may include a polyvinyl alcohol polarizer and a protective film attached to at least one surface of the polyvinyl alcohol polarizer.

The polarizing layer 210 may be directly adhered to the one surface of the window substrate 230 or may be attached thereto through a first adhesive layer 220.

The touch sensor 200 may be included in the window stack structure 250 in a form of a film or panel. In an embodiment, the touch sensor 200 may be coupled with the polarizing layer 210 through a second adhesive layer 225. As shown in FIG. 16, the window substrate 230, the polarizing layer 210 and the touch sensor 200 may be disposed in this order from a visible side of a user. In this case, since the sensing electrodes of the touch sensor 200 are disposed under the polarizing layer 210, it is possible to more effectively prevent a phenomenon in which the electrode is viewed.

When the touch sensor 200 includes a substrate, the substrate may include, for example, triacetyl cellulose, cycloolefin, cycloolefin copolymer, polynorbornene copolymer, and the like, and preferably has a front retardation of ±2.5 or less.

In an embodiment, the touch sensor 200 may be directly transferred onto the window substrate 230 or the polarizing layer 210. In an embodiment, the window substrate 230, the touch sensor 200, and the polarizing layer 210 may be arranged in this order from the visible side of the user.

The image display device may include a display panel 360 and the above-described window stack structure 250 coupled to the display panel 360.

The display panel 360 may include a pixel electrode 310, a pixel defining layer 320, a display layer 330, a counter electrode 340, and an encapsulation layer 350, which are disposed on a panel substrate 300.

A pixel circuit including a thin film transistor (TFT) may be formed on the panel substrate 300, and an insulation film may be formed thereon to cover the pixel circuit. The pixel electrode 310 may be electrically connected to a drain electrode of the TFT on the insulation film, for example.

The pixel defining layer 320 may be formed on the insulation film to define a pixel region by exposing the pixel electrode 310. A display layer 330 is formed on the pixel electrode 310, and the display layer 330 may include, for example, a liquid crystal layer or an organic light emitting layer.

The counter electrode 340 may be disposed on the pixel defining layer 320 and the display layer 330. The counter electrode 340 may be provided as a common electrode or a cathode of the image display device, for example. The encapsulation layer 350 for protecting the display panel 360 may be laminated on the counter electrode 340.

In some embodiments, the display panel 360 and the window stack structure 250 may be coupled with each other through an adhesive layer 260. For example, the adhesive layer 260 may have a thickness greater than the thicknesses of each of the first and second adhesive layers 220 and 225, and a viscoelasticity of about 0.2 MPa or less at −20 to 80° C. In this case, noise from the display panel 360 may be shielded, and interfacial stress may be relieved during bending to suppress a damage to the window stack structure 250. In an embodiment, the viscoelasticity may be about 0.01 to 0.15 MPa.

The touch sensor 200 includes the sensing electrode in which the etching region according to the above-described exemplary embodiments is formed. Accordingly, it is possible to prevent the moiré phenomenon due to overlapping with the pixel circuit included in the display panel 360 and improve image quality.

Hereinafter, experimental examples including specific examples and comparative examples will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope and spirit of the present invention and duly included within the range as defined by the appended claims.

Experimental Example 1: Evaluation of Moiré Depending on Change in CD of Etching Region ITO was deposited on a COP substrate, and then patterned to have a thickness of 450 Å, respectively, and as shown in FIGS. 4 and 5, first sensing electrodes 110 and second sensing electrodes 130 including wave-shaped etching regions 112 and 132 were formed thereon.

As shown in FIG. 6, a plurality of touch sensor samples were prepared while changing the width CD of the etching region.

The touch sensor samples were laminated on a display panel test sample obtained from a commercially available mobile display product so that the etching region is tilted at 45 degrees in the width direction (for example, the first direction) of the display panel test sample, and then the moiré pattern was observed to evaluate moiré generation levels of five grades from Lv.0 (minimum of moiré) to Lv.5 (maximum of moiré).

Specifically, levels were selected by observing a contrast (i.e., a difference between light and dark) and a pattern period of the generated moiré pattern by ten panels, and the level values were averaged to evaluate the moiré generation levels.

Exemplary evaluation criteria of moiré level are as follows.

i) Lv.0: Moiré was not viewed
ii) Lv.1: Low contrast/high frequency (about 0-1 mm pattern period)
iii) Lv.2: Low contrast/medium frequency (about 2-3 mm pattern period)
iv) Lv.3: Low contrast/low frequency (about 4-5 mm pattern period)
v) Lv.4: Medium contrast/medium frequency (about 2-3 mm pattern period)
vi) Lv.5: Medium contrast/low frequency (about 4-5 mm pattern period)

The evaluation results are shown in Table 1 below.

TABLE 1

| | Width (CD) (μm) | | | | | | |
|---|---|---|---|---|---|---|---|
| 8 | 10 | 12 | 13 | 15 | 17 | 20 | 23 |
| Moiré level Lv.0 | Lv.0 | Lv.0 | Lv.1 | Lv.1 | Lv.4 | Lv.5 | Lv.5 |

Referring to Table 1, the generation of moiré was substantially suppressed up to 15 μm of the width CD of the etching region, and the moiré phenomenon was significantly increased when the width CD exceeds 15 μm.

Experimental Example 2: Evaluation of Moiré Depending on Change in Tilting Angle The touch sensor sample having a width CD of 10 μm in the etching region prepared in Experimental Example 1 was laminated on the display panel test sample, and then the width direction of the display panel test sample was set to be 0 degrees. Thereafter, the touch sensor sample was tilted while imparting an angle in a counter clockwise direction.

The generation of moiré was evaluated in the same manner as in Experimental Example 1 depending on the tilting angle, and the evaluation results are shown in Table 2 below.

TABLE 2

| | Tilting angle (°) | | | | | | | |
|---|---|---|---|---|---|---|---|---|
| 0 | 5 | 15 | 30 | 45 | 60 | 75 | 80 | 90 |
| Moiré level Lv.3 | Lv.4 | Lv.2 | Lv.1 | Lv.0 | Lv.1 | Lv.2 | Lv.4 | Lv.3 |

Referring to Table 2, the generation of moiré was substantially suppressed in a range of 15 to 75 degrees, and the generation of moiré was more effectively prevented in a range of 30 to 60 degrees.

What is claimed is:

1. A touch sensor comprising:
a substrate layer; and
sensing electrodes disposed on the substrate layer, the sensing electrodes comprising etching regions periodically repeated therein and respectively having a width of 5 to 15 μm,
wherein the etching region includes a water wave shape extending between vertices of an imaginary polygon; and
the etching region has a shape in which a water wave of one period is cut.

2. The touch sensor according to claim 1, wherein the etching regions comprise a slit shape formed inside the sensing electrode.

3. The touch sensor according to claim 1, wherein the etching regions are inclined at a predetermined tilting angle with respect to a width direction or a length direction of the touch sensor.

4. The touch sensor according to claim 3, wherein the tilting angle is 15 to 75 degrees.

5. The touch sensor according to claim 3, wherein the tilting angle is 30 to 60 degrees.

6. The touch sensor according to claim 1, wherein the sensing electrodes comprise:
first sensing electrodes which form a sensing electrode row; and second sensing electrodes which form a sensing electrode column, wherein the etching regions comprise first etching regions formed in the first sensing electrodes and second etching regions formed in the second sensing electrodes.

7. The touch sensor according to claim 6, wherein the sensing electrode row extends to be inclined with respect to the width direction of the touch sensor at a first tilting angle, and the sensing electrode column extends to be inclined with respect to the length direction of the touch sensor at a second tilting angle.

8. The touch sensor according to claim 7, wherein the first tilting angle and the second tilting angle are 15 to 75 degrees, respectively.

9. The touch sensor according to claim 7, wherein the first tilting angle and the second tilting angle are 30 to 60 degrees, respectively.

10. The touch sensor according to claim 6, wherein the sensing electrode column further comprises connection parts which integrally connect the second sensing electrodes adjacent to each other, and the sensing electrode row comprises bridge electrodes which electrically connect the first sensing electrodes adjacent to each other.

11. The touch sensor according to claim 10, wherein each of the connection parts comprises a third etching region formed therein.

12. The touch sensor according to claim 11, wherein the bridge electrode is overlapped with the third etching region of the each of the connection parts in a planar direction.

13. The touch sensor according to claim 6, further comprising a dummy pattern defined by separation regions formed between peripheries of the first sensing electrode and second sensing electrode adjacent to each other.

14. The touch sensor according to claim 13, wherein the sensing electrodes comprise unit cells surrounded by the etching regions; and the dummy pattern comprises the same shape as the unit cell.

15. A window stack structure comprising:

a window substrate; and the touch sensor according to claim 1 stacked on the window substrate.

16. An image display device comprising:

a display panel; and the touch sensor according to claim 1 stacked on the display panel.

17. The image display device according to claim 16, wherein the etching regions are disposed to be tilted at a predetermined tilting angle with respect to a width direction or a length direction of the display panel.

* * * * *